(12) United States Patent
Murayama (10) Patent No.: US 10,634,975 B2
(45) Date of Patent: Apr. 28, 2020

(54) FINDER OPTICAL SYSTEM

(71) Applicant: RICOH IMAGING COMPANY, LTD., Tokyo (JP)

(72) Inventor: Minoru Murayama, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/759,682

(22) PCT Filed: Aug. 12, 2016

(86) PCT No.: PCT/JP2016/073707
§ 371 (c)(1),
(2) Date: Mar. 13, 2018

(87) PCT Pub. No.: WO2017/056753
PCT Pub. Date: Apr. 6, 2017

(65) Prior Publication Data
US 2019/0041725 A1 Feb. 7, 2019

(30) Foreign Application Priority Data

Sep. 28, 2015 (JP) .................. 2015-189762

(51) Int. Cl.
*G03B 13/02* (2006.01)
*G02B 5/04* (2006.01)
(Continued)

(52) U.S. Cl.
CPC .............. *G03B 13/02* (2013.01); *G02B 5/04* (2013.01); *G02B 5/28* (2013.01); *G02B 17/045* (2013.01); *G02B 23/14* (2013.01); *G03B 19/12* (2013.01)

(58) Field of Classification Search
CPC ......... G03B 13/02; G03B 19/12; G02B 23/14
See application file for complete search history.

(56) References Cited

U.S. PATENT DOCUMENTS

| 4,309,078 A | * | 1/1982 | Hara | ................. G02B 27/0018 |
| | | | | 359/601 |
| 4,922,282 A | * | 5/1990 | Koyama | ................. G02B 7/34 |
| | | | | 250/201.2 |

(Continued)

FOREIGN PATENT DOCUMENTS

| JP | H8-101301 A | 4/1996 |
| JP | 2009-003209 A | 1/2009 |

(Continued)

OTHER PUBLICATIONS

International Search Report issued in International Patent Application No. PCT/JP2016/073707, dated Nov. 15, 2016.

*Primary Examiner* — Noam Reisner
(74) *Attorney, Agent, or Firm* — Greenblum & Bernstein, P.L.C.

(57) ABSTRACT

A finder optical system is achieved in which object images can be more easily observed.
A finder optical system includes an image-erecting member, which erects an object image formed by an objective optical system, provided on an optical path from the object side toward an eyepiece side, wherein the image-erecting member is formed as a penta roof prism provided with a first reflection surface and a second reflection surface, which define a roof reflection surface that reflects an incident light bundle emanated from the object, and the first reflection surface and the second reflection surface are configured as total-reflection surfaces that totally reflect the light bundle including the object image.

20 Claims, 4 Drawing Sheets

(51) Int. Cl.
*G02B 5/28* (2006.01)
*G03B 19/12* (2006.01)
*G02B 23/14* (2006.01)
*G02B 17/04* (2006.01)

(56) References Cited

U.S. PATENT DOCUMENTS

2012/0082443 A1* 4/2012 Yamamoto .............. G02B 1/11
396/111
2014/0063335 A1* 3/2014 Hirai .................... H04N 5/2252
348/374
2014/0168499 A1* 6/2014 Sasaki .................. H04N 5/2251
348/341

FOREIGN PATENT DOCUMENTS

| JP | 2010-237429 A | 10/2010 | | |
|----|---------------|---------|---|---|
| JP | 2012-103303 A | 5/2012 | | |
| JP | 2012-127984 A | 7/2012 | | |
| JP | 2012127984 A | * 7/2012 | ............. | G03B 19/12 |
| JP | 2012-185254 A | 9/2012 | | |

* cited by examiner

FINDER OPTICAL SYSTEM

TECHNICAL FIELD

The present invention relates to a finder optical system, e.g., a finder optical system for use in a single-lens reflex (SLR) camera.

BACKGROUND ART

A finder optical system of an SLR camera has a configuration in which an object image passes through a photographing lens, is reflected by a quick-return mirror, is formed as a right-to-left inverted image on a focusing plate, is erected by an image-erection member such as a penta roof prism (pentagonal roof prism), and is observed with a loupe optical system. In order to facilitate observation of the object image, there is a demand for a bright finder optical system that has a large observation magnification. It is known that if the refractive index of the image-erection member is increased in order to increase the observation magnification, since the air-equivalent length (geometric thickness along the optical axis/refractive index) of the image-erection member can be shortened, the focal length of the loupe optical system can also be shortened and the observation magnification can be increased.

On the other hand, generally speaking, the higher the refractive index of the material, the lower the transmittance at the short wavelength side from around the vicinity of 450 nm to 460 nm compared to the transmittance at the long wavelength region. Since the geometrical thickness of the image-erection member is approximately 70 mm through 100 mm, which is a large thickness, if a material having a high refractive index is used for the image-erection member, although the observation magnification can be increased, the transmittance of the light bundle deteriorates at the short wavelength region, so that the finder image appears visibly yellow.

In Patent Literature 1, an example is disclosed in which a material having a high refractive index (1.69680 or 1.73400) is used for an image-erection member (penta roof prism). However, there is no reference whatsoever in Patent Literature 1 in regard to the problem of coloration of a finder image, nor in regard to countermeasures therefor.

Patent Literature 2 discloses a reflection-peak wavelength of spectral reflection characteristics for a first reflection member (the reflection member at the emitting side), out of a plurality of reflection members of the image-erection member, being set to within a range of 380 nm through 500 nm in order to prevent a coloration phenomenon caused by the image-erection member (penta roof prism); and discloses, as a more preferable embodiment, a reflection-peak wavelength of spectral reflection characteristics for a second reflection member (the reflection member at the incident side) being set to within a range of 500 nm through 600 nm. However, in Patent Literature 2, the image-erection member only has a refractive index of approximately 1.56, and therefore having a problem with the observation magnification being insufficient. Furthermore, although Patent Literature 2 pays attention to "a coloration phenomenon caused by the image-erection member", the problems that occur if the observation magnification is attempted to be further increased are not sufficiently solved.

CITATION LIST

Patent Literature

Patent Literature 1: Japanese Unexamined Patent Publication No. 2010-237429
Patent Literature 2: Japanese Unexamined Patent Publication No. 2012-127984

SUMMARY OF INVENTION

Technical Problem

The present invention has been devised in view of the above-described problems and has an objective of achieving a finder optical system in which object images can be more easily observed.

Solution to Problem

A finder optical system of the present invention includes an image-erecting member, which erects an object image formed by an objective optical system, provided on an optical path from the object side toward an eyepiece side, wherein the image-erecting member is formed as a penta roof prism provided with a first reflection surface and a second reflection surface, which define a roof reflection surface that reflects an incident light bundle emanated from the object, and the first reflection surface and the second reflection surface are configured as total-reflection surfaces that totally reflect the light bundle including the object image.

It is desirable for the finder optical system to satisfy the following condition (1):

$$TR1_{Total}/TR2_{Total} > 1.05 \qquad (1),$$

wherein $TR1_{Total}$ designates an accumulated value of the average reflectance, with respect to light having a wavelength 400 nm through 450 nm, of the reflection surfaces in the optical path on the eyepiece side from the objective optical system other than the first and second reflection surfaces, and the average transmittance, with respect to light having a wavelength 400 nm through 450 nm, of the transmissive optical elements other than the penta roof prism, and $TR2_{Total}$ designates an accumulated value of the average reflectance, with respect to light having a wavelength 500 nm through 650 nm, of the reflection surfaces in the optical path on the eyepiece side from the objective optical system other than the first and second reflection surfaces, and the average transmittance, with respect to light having a wavelength 500 nm through 650 nm, of the transmissive optical elements other than the penta roof prism.

It is desirable for the finder optical system to satisfy the following condition (2):

$$R1_{Total}/R2_{Total} > 1.05 \qquad (2),$$

wherein $R1_{Total}$ designates an accumulated value of the average reflectance, with respect to light having a wavelength 400 nm through 450 nm, of reflection surfaces in the optical path on the eyepiece side from the objective optical system other than the first and second reflection surfaces; and $R2_{Total}$ designates an accumulated value of the average reflectance, with respect to light having a wavelength 500 nm through 650 nm, of reflection surfaces in the optical path on the eyepiece side from the objective optical system other than the first and second reflection surfaces.

It is desirable for the penta roof prism to be further provided with a third reflection surface, by which a light bundle that is reflected from the first and second reflection surface reflects and exits toward the eyepiece side, and for a reflection treatment to be applied to the third reflection surface satisfies the following condition (3):

$$R1a/R2a > 1.05 \quad (3),$$

wherein R1$a$ designates the average reflectance, with respect to light having a wavelength 400 nm through 450 nm, of the third reflection surface, and R2$a$ designates the average reflectance, with respect to light having a wavelength 500 nm through 650 nm, of the third reflection surface.

It is desirable for the third reflection surface to include a half-transparent surface on which a dielectric multi-layered film is formed and functions as a light-bundle superimposing surface, which superimposes a light bundle from an information display device with the finder optical system light path, to display predetermined information within the field-of-view of the finder optical system.

It is desirable for a fourth reflection surface to be provided, which guides a light bundle from the objective optical system to the penta roof prism, and for the fourth reflection surface to satisfy the following condition (4):

$$R1b/R2b > 1.05 \quad (4),$$

wherein R1$b$ designates the average reflectance, with respect to light having a wavelength 400 nm through 450 nm, of the fourth reflection surface, and R2$b$ designates the average reflectance, with respect to light having a wavelength 500 nm through 650 nm, of the fourth reflection surface.

It is desirable for the finder optical system to satisfy the following condition (5):

$$T1_{Total}/T2_{Total} > 1.05 \quad (5),$$

wherein $T1_{Total}$ designates an accumulated value of the average transmittance, with respect to light having a wavelength 400 nm through 450 nm, of transmissive optical elements in the optical path on the eyepiece side from the objective optical system other than the penta roof prism, and $T2_{Total}$ designates an accumulated value of the average transmittance, with respect to light having a wavelength 500 nm through 650 nm, of transmissive optical elements in the optical path on the eyepiece side from the objective optical system other than the penta roof prism.

It is desirable for an optical element to be provided, including a light-bundle superimposing surface at a position toward the eyepiece side with respect to the penta roof prism, wherein the optical element including the light-bundle superimposing surface reflects and superimposes a light bundle from the information display device onto the optical path of the finder optical system, and for the following condition (6) to be satisfied:

$$T1/T2 > 1.05 \quad (6),$$

wherein T1 designates the average transmittance, with respect to light having a wavelength 400 nm through 450 nm, of the optical element including a light-bundle superimposing surface, and T2 designates the average transmittance, with respect to light having a wavelength 500 nm through 650 nm, of the optical element including a light-bundle superimposing surface.

It is desirable for the finder optical system to satisfy the following condition (7):

$$\lambda i > 500 \quad (7),$$

wherein $\lambda i$ designates a peak wavelength, in nanometers, of a light bundle from the information display device.

It is desirable for each surface of the first and second reflection surfaces to have undergone an anti-contamination treatment for maintaining total reflection of the light bundle including the object image.

It is desirable for the finder optical system to satisfy the following condition (8):

$$np > 1.62 \quad (8),$$

wherein np designates the refractive index at the d-line of the material of the penta roof prism.

It is desirable for the finder optical system of the present invention to satisfy the following condition (8') from within the range of condition (8):

$$np > 1.74 \quad (8').$$

Advantageous Effects of Invention

According to the present invention, a finder optical system is achieved in which object images can be more easily observed.

DESCRIPTION OF EMBODIMENTS

Figure 1:
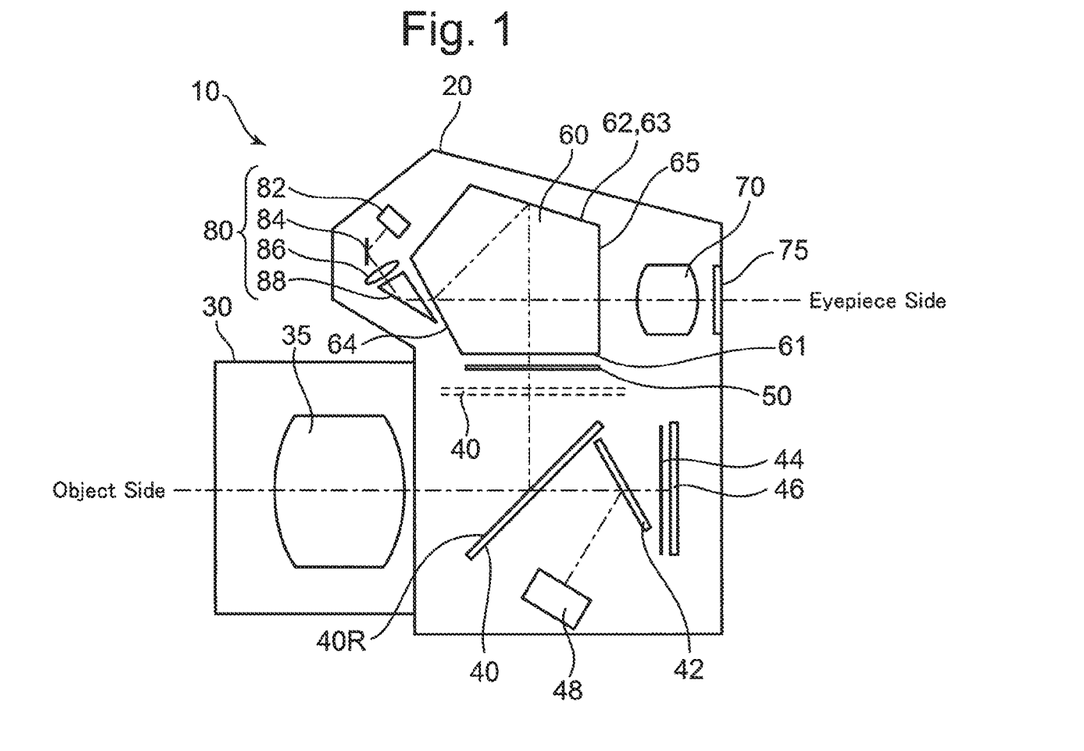
FIG. 1 shows a configuration of a single-lens reflex camera including a finder optical system, according to the present embodiment.

FIG. 1 shows a configuration of a single-lens reflex camera 10 including a finder optical system, according to the present embodiment. The single-lens reflex camera 10 is provided with a camera body 20 and an interchangeable lens barrel 30, which is detachably attached to the camera body 20.

The interchangeable lens barrel 30 is provided with an objective optical system 35 that collects an incident light bundle from the object side and guides the incident light bundle into the camera body 20. Although FIG. 1 portrays the objective optical system 35 as a single lens element, in practice the objective optical system 35 can be configured of a plurality of lens elements.

The camera body 20 is provided with a quick-return mirror 40, a focusing plate 50, a penta roof prism (image-erecting member) 60, and a loupe optical system 70.

The quick-return mirror 40 is provided with a reflection surface (fourth reflection surface) 40R, which is formed as a half-transparent surface. The quick-return mirror 40 is rotatably drivable, by a rotational-drive mechanism not shown in the drawings, between a mirror-down position (shown by solid lines in FIG. 1) that is positioned on an optical path from the objective optical system 35, and a mirror-up position (shown by broken lines in FIG. 1) retreated away from the optical path, from the objective optical system 35. A sub-mirror 42 is attached to the quick-return mirror 40. The sub-mirror 42 is positioned on the optical path immediately behind the quick-return mirror 40 when the quick-return mirror 40 is at the mirror-down position, and is retreated away from the optical path together with the quick-return mirror 40 when the quick-return mirror 40 is in the mirror-up position.

When the quick-return mirror 40 is in the mirror-up position, the object-emanating light bundle that is incident from the objective optical system 35 passes through a shutter (not shown) and an optical filter 44, and forms an object image on a light-receiving surface of an image sensor 46. This object image is electrically converted into pixel signals via a large number of pixels, arranged in a matrix, and is output to a camera CPU (not shown) as image data. The camera CPU performs predetermined image processing on the image data from the image sensor 46, and this processed image data is displayed on an LCD and is stored in an image memory (not shown).

When the quick-return mirror 40 is at the mirror-down position, the majority of the object-emanating light bundle incident from the objective optical system 35 is reflected by the reflection surface 40R and is guided to the focusing plate 50 and the penta roof prism 60. In addition, a remaining portion of the object-emanating light bundle incident from the objective optical system 35 passes through the reflection surface 40R of the quick-return mirror 40, is reflected by the sub-mirror 42, and is guided to an AF unit 48. The AF unit 48 carries out distance measurement and photometering for autofocusing based on the incident light bundle from the sub-mirror 42.

The object-emanated light bundle which is reflected by the reflection surface 40R of the quick-return mirror 40 is formed as an object image on the focusing plate 50. The imaging surface on the focusing plate 50 is optically equivalent to the imaging surface of the image sensor 46.

The penta roof prism 60 is a component for converting (erecting) the object image formed via the objective optical system 35, the quick-return mirror 40 and the focusing plate 50, into an erected image.

Figure 2:
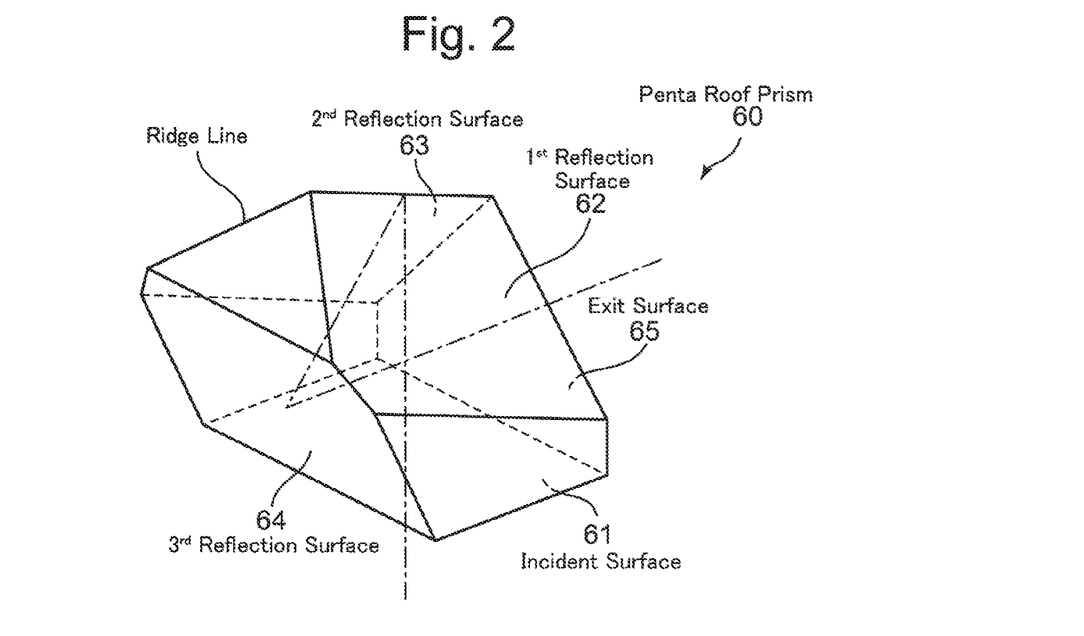
FIG. 2 is a perspective view of a configuration of a penta roof prism (image-erecting member).

As shown in FIGS. 1 and 2, the penta roof prism 60 is provided with an incident surface 61, to which a light bundle from the object side is incident; a first reflection surface 62 and a second reflection surface 63 which reflect the incident light bundle from the incident surface 61; a third reflection surface 64 which reflects the light bundle from the first and second reflection surfaces 62 and 63 toward the eyepiece side; and an exit surface 65 from which the light bundle from the third reflection surface 64 exits toward the eyepiece side. An anti-reflective coating is formed onto each of the incident surface 61 and the exit surface 65. The anti-reflective coating characteristics can be, e.g., substantially flat-line, having a reflectance of less than 2 or 3% with respect to a wavelength region of 400 nm through 650 nm.

The first reflection surface 62 and the second reflection surface 63 constitute a roof reflection surface, which is a 90-degree apex-angle portion of the penta roof prism 60. The first reflection surface 62 and the second reflection surface 63 are configured as total-reflection surfaces that totally reflect the light bundle including the object image.

Each surface of the first reflection surface 62 and the second reflection surface 63 has undergone an anti-contamination treatment (e.g., a fluorine coating) for maintaining total reflection of the light bundle including the object image. In the case where the roof surface (the first reflection surface 62 and the second reflection surface 63) is used as a total-reflection surface, the optical surface becomes exposed, so that meticulous care is demanded in order not allow dirt to adhere to the optical surface during the assembly process. If an anti-contamination treatment (e.g., a fluorine coating) is carried out on the roof surface (the first reflection surface 62 and the second reflection surface 63) so that dirt does not easily adhere thereto, even if dirt was to adhere to the roof surface, such dirt can be easily removed, thereby facilitating assembly.

The third reflection surface 64 is a half-transparent surface on which a dielectric multi-layered film is formed and functions as a light-bundle superimposing surface, which superimposes a light bundle from an information display device with the finder optical system light path, to display predetermined information within the field-of-view of the finder optical system. In other words, an illumination light source 82, a reflection mirror 84, a diopter-adjustment lens 86, and an auxiliary prism 88 are provided, as a superimposing optical system (information display device) 80, outside the third reflection surface 64.

The object image in the light bundle that exits from the exit surface 65 of the penta roof prism 60 can be viewed via an eyepiece window 75 after being magnified by the loupe optical system 70.

Figure 3:
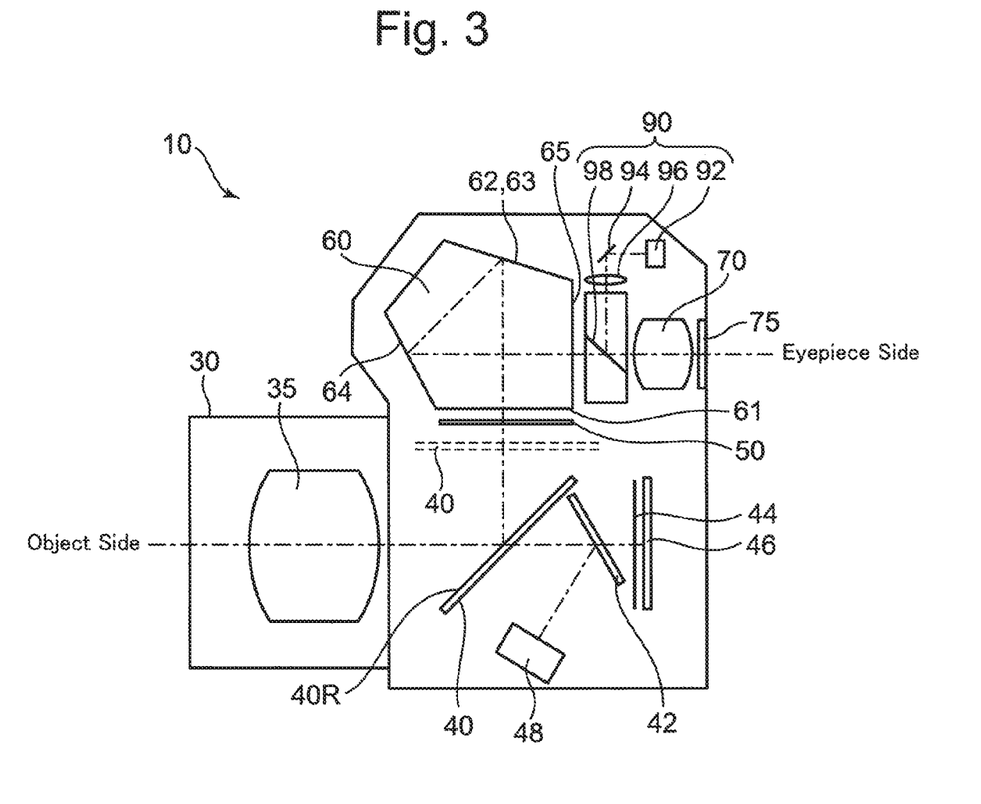
FIG. 3 shows a single-lens reflex camera including a finder optical system according to another embodiment.

FIG. 3 shows another embodiment of the single-lens reflex camera 10 including a finder optical system. In this other embodiment, an optical element, which includes a light-bundle superimposing surface which superimposes a light bundle from an information display device with the finder optical system light path, is provided at a position toward the eyepiece side of the penta roof prism 60. More specifically, in this other embodiment, the superimposing optical system 80 that is positioned outside the third reflection surface 64 of the penta roof prism 60 in the single-lens reflex camera 10 of FIG. 1 has been omitted (replaced), and a superimposing optical system (information display device) 90 is provided on the optical path between the penta roof prism 60 and the loupe optical system 70. The superimposing optical system 90 is provided with an illumination light source 92, a reflection mirror 94, a diopter-adjustment lens 96, and a half transparent mirror 98. The half transparent mirror 98 and the half-transparent surface thereof correspond to an optical element and a light-bundle superimposing surface.

In the finder optical system of the present embodiment, by using a material having a high refractive index for the penta roof prism 60, the air-equivalent length from the focusing plate 50 to the loupe optical system 70 can be shortened. Accordingly, the focal length of the loupe optical system 70 can be shortened and the observation magnification can be increased; however, there is a tendency for the short-wavelength transmittance to be reduced due to the high refractive-index characteristic of the material.

Figure 4:
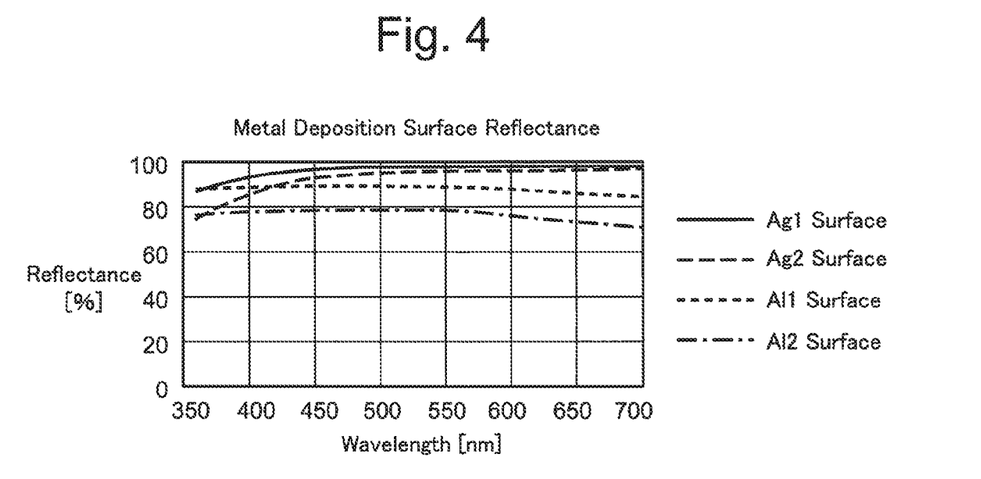
FIG. 4 is a diagram showing the reflectance of metal deposition films (surfaces).

Silver or aluminum are used as a metal deposition film for reflecting visible light rays, and silver, which has a high reflectance of visible light in particular, is often used. However, silver has a lower reflectance at the short-wavelength side than at the long-wavelength side, and if silver is applied onto a roof surface, the light rays being reflected twice by the metal deposition film causes the quantity of light at the short-wavelength side to be further reduced. Although aluminum has comparatively flat-line reflectance characteristics in the visible light wavelength region, the overall reflectance is low. FIG. 4 shows the reflectance of metal deposition films (surfaces). As can be understood from FIG. 4, each drawback is accentuated in the case where light rays are reflected twice.

Hence, in the finder optical system according to the present invention, the entire light bundle can be totally-reflected stably, and loss of light quantity and coloration due to reflecting off the roof surface (the first reflection surface 62 and the second reflection surface 63) can be reduced by having the penta roof prism 60, having an ultra-high refractive index, practically touch ambient air (air) without applying reflection treatment such as a conventional metal deposition film on the roof surface (the first reflection surface 62 and the second reflection surface 63) of the penta roof prism 60. Furthermore, in order to suppress image-quality deterioration occurring upon total reflection, it is also possible to apply a phase-difference correction coating used in a Pechan prism disclosed in, e.g., Japanese Unexamined patent publication no. H11-326781.

Figure 5:
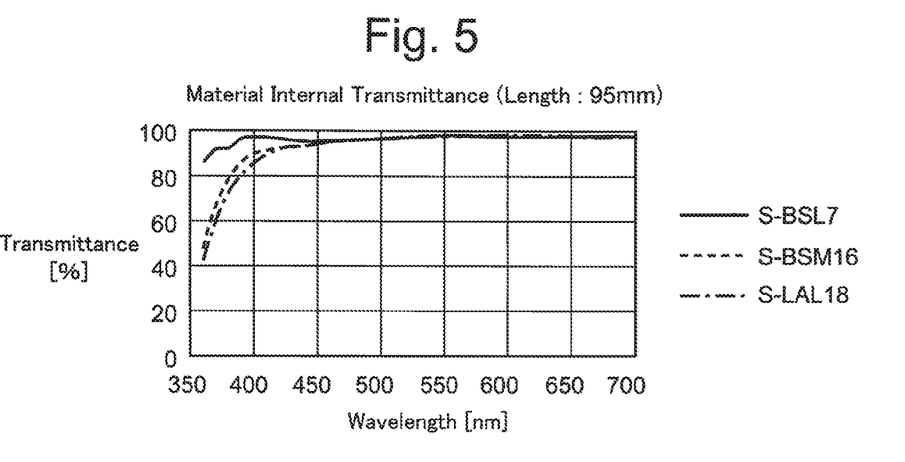
FIG. 5 is a diagram showing internal transmittances of different materials.

A material having a high refractive index has a characteristic in which the transmittance reduces at the short wavelength side, especially from around 450 nm to 460 nm. Although this characteristic poses no problem for a lens element that has a thickness of a few millimeters, this characteristic has a significant influence on a penta roof prism having a geometrical thickness (actual thickness) of the penta roof prism of around 70 mm to 100 mm along the optical axis, so that the object image (finder image) appears visibly yellow. FIG. 5 shows internal transmittances at a length of 95 mm for, e.g., OHARA (Inc.) S-BSL7 (nd=1.51633), S-BSM16 (nd=1.62041) and S-LAL18 (nd=1.72916), as examples of internal transmittances for materials. As shown in FIG. 5, it can be understood that as the refractive index increases, the transmittance is reduced at the short wavelength side from around 450 nm. For example, if a silver deposition film is applied so that the roof surface does not totally reflect light rays, the light quantity at the short wavelength side further deteriorates.

The finder optical system according to the present embodiment satisfies at least one of conditions (1) through (6) for solving the important technical problem of the object image (finder image) appearing visibly yellow due to using a material for the penta roof prism 60 having a very high refractive index.

By satisfying at least one of conditions (1) through (6), the object image (finder image) appearing visibly yellow, due to using a material for the penta roof prism 60 having a very high refractive index, can be effectively prevented (corrected). Whereas, if none of conditions (1) through (6) are satisfied, the object image (finder image) appears visibly yellow due to using a material for the penta roof prism 60 having a very high refractive index. In addition, by satisfying condition (7), when photographing information for the object image is superimposed and displayed, such photographing information can be brightly displayed.

Condition (1) specifies a ratio of $TR1_{Total}$ to $TR2_{Total}$, wherein $TR1_{Total}$ designates an accumulated value of the average reflectance, with respect to light having a wavelength 400 nm through 450 nm, of reflection surfaces in the optical path on the eyepiece side from the objective optical system 35 other than the first and second reflection surfaces 62 and 63, and the average transmittance, with respect to light having a wavelength 400 nm through 450 nm, of the transmissive optical elements other than the penta roof prism 60; and $TR2_{Total}$ designates an accumulated value of the average reflectance, with respect to light having a wavelength 500 nm through 650 nm, of reflection surfaces in the optical path on the eyepiece side from the objective optical system 35 other than the first and second reflection surfaces 62 and 63, and the average transmittance, with respect to light having a wavelength 500 nm through 650 nm, of the transmissive optical elements other than the penta roof prism 60.

Condition (2) specifies a ratio of $R1_{Total}$ to $R2_{Total}$, wherein $R1_{Total}$ designates an accumulated value of the average reflectance, with respect to light having a wavelength 400 nm through 450 nm, of reflection surfaces in the optical path on the eyepiece side from the objective optical system 35 other than the first and second reflection surfaces 62 and 63; and $R2_{Total}$ designates an accumulated value of the average reflectance, with respect to light having a wavelength 500 nm through 650 nm, of reflection surfaces in the optical path on the eyepiece side from the objective optical system 35 other than the first and second reflection surfaces 62 and 63.

Condition (3) specifies a reflection treatment that is applied to the third reflection surface 64 of the penta roof prism 60. In other words, condition (3) specifies a ratio of $R1a$ to $R2a$, wherein $R1a$ designates the average reflectance, with respect to light having a wavelength 400 nm through 450 nm, of the third reflection surface 64; and $R2a$ designates the average reflectance, with respect to light having a wavelength 500 nm through 650 nm, of the third reflection surface 64.

Figure 6:
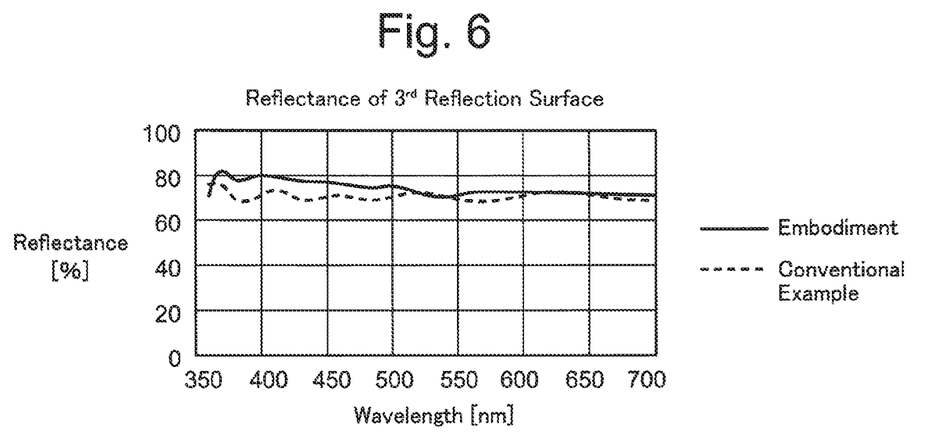
FIG. 6 is a diagram showing reflectance characteristics of a third reflection surface of a finder optical system of the present embodiment and a third reflection surface of a conventional finder optical system.

FIG. 6 shows the reflectance characteristics of the third reflection surface 64 of the finder optical system according to the present embodiment and the reflectance characteristics of the third reflection surface of a conventional finder optical system. The corresponding numerical value of condition (3) for the third reflection surface 64 of the present embodiment is 1.08, and the corresponding numerical value of condition (3) of the third reflection surface of the conventional finder optical system is 1.00. Accordingly, in the conventional finder optical system, the object image (finder image) appears visibly yellow due to using a material for the penta roof prism having a very high refractive index; however, in the finder optical system according to the present embodiment, the occurrence of the object image (finder image) appearing visibly yellow due to using a material for the penta roof prism 60 having a very high refractive index can be effectively prevented (corrected).

An optimum value of $R1a/R2a$ with respect to the coloration code of the material can be determined by the following manner. Namely, since the ratio of the coloration code $\lambda 80$ (a wavelength such that the spectral transmittance including reflection loss is 80% for a specimen having a thickness of 10 mm) of the material to the transmittance (average transmittance of 400 nm to 450 nm/average transmittance of 500 nm to 650 nm) are linear to some extent, R1a/R2a can be expressed in the following manner so as to correct such a ratio:

$$R1a/R2a \geq 0.0015 \times \lambda 80 + 0.51$$

Figure 7:
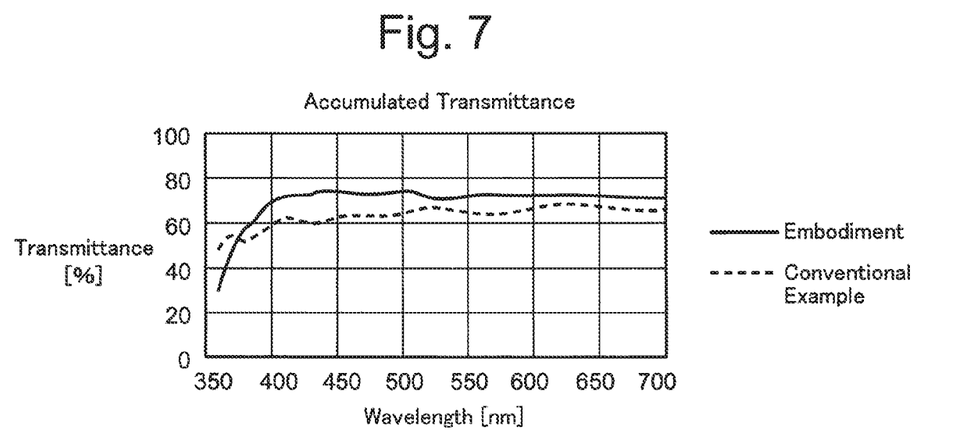
FIG. 7 is a diagram showing accumulated transmittance characteristics of the internal transmittance and the reflectance of reflection surfaces of a penta roof prism (image-erecting member) of a finder optical system according to the present embodiment, and of a penta roof prism (image-erecting member) of a conventional finder optical system.

FIG. 7 shows accumulated transmittance characteristics of the internal transmittance and the reflectance of reflection surfaces of the penta roof prism (image-erecting member) 60 of the finder optical system according to the present embodiment and of a penta roof prism (image-erecting member) of a conventional finder optical system. The penta roof prism 60 of the present embodiment uses S-LAL18 for the material, the roof surface is a totally reflection surface, and has a coating that satisfies condition (3) in FIG. 6 (R1a/R2a=1.08) applied onto the third reflection surface. The penta roof prism of a conventional finder optical system uses S-BSL7 for the material, the roof surface has a silver coating, and has a flat coating that does not satisfy condition (3) in FIG. 6 (R1a/R2a=1.00) applied onto the third reflection surface. As can be understood from FIG. 7, even though the penta roof prism 60 of the present embodiment uses a material having a high refractive index, a bright finder image can be achieved that has flat-line transmissive characteristics for accumulated transmittances over the entire visible light region with no coloration, and having an increased transmittance.

Condition (4) specifies the reflectance of the reflection surface 40R of the quick-return mirror 40. Namely, condition (4) specifies a ratio of R1b to R2b, wherein R1b designates the average reflectance, with respect to light having a wavelength 400 nm through 450 nm, of the reflection surface 40R, and R2b designates the average reflectance, with respect to light having a wavelength 500 nm through 650 nm of the reflection surface 40R.

Condition (5) specifies a ratio of $T1_{Total}$ to $T2_{Total}$, wherein $T1_{Total}$ designates an accumulated value of the average transmittance, with respect to light having a wavelength 400 nm through 450 nm, of transmissive optical elements in the optical path on the eyepiece side from the objective optical system 35 other than the penta roof prism 60; and $T2_{Total}$ designates an accumulated value of the average transmittance, with respect to light having a wavelength 500 nm through 650 nm, of transmissive optical elements in the optical path on the eyepiece side from the objective optical system 35 other than the penta roof prism 60.

Condition (6) specifies, with respect to the finder optical system shown in FIG. 3, transmittance characteristics of the half transparent mirror 98 (optical element including a light-bundle superimposing surface) of the superimposing optical system 90 that is positioned between the penta roof prism 60 and the loupe optical system 70. In other words, condition (6) specifies a ratio of T1 to T2, wherein T1 designates the average transmittance, with respect to light having a wavelength 400 nm through 450 nm, of the half transparent mirror 98 (optical element including a light-bundle superimposing surface); and T2 designates the average transmittance, with respect to light having a wavelength 500 nm through 650 nm, of the half transparent mirror 98 (optical element including a light-bundle superimposing surface).

Figure 8:
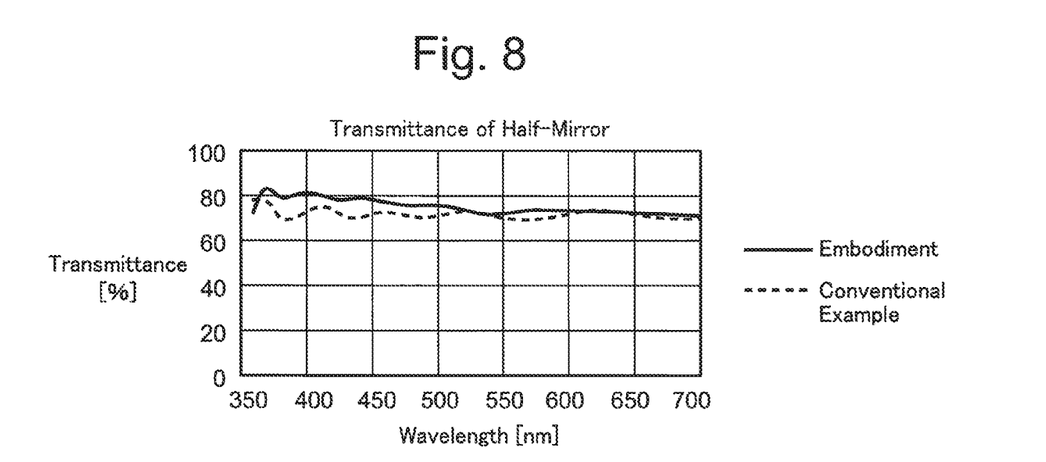
FIG. 8 is a diagram showing transmittance characteristics of a half transparent mirror (half-mirror) in the finder optical system according to the present embodiment, and of a half transparent mirror (half-mirror) in a finder optical system according to a conventional example.
Figure 9:
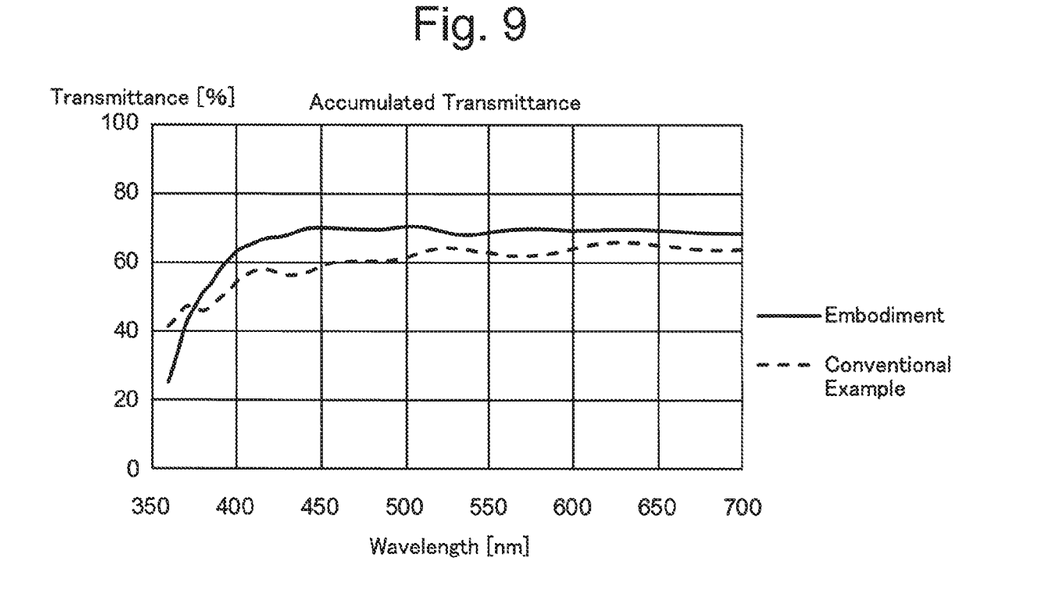
FIG. 9 is a diagram showing accumulated transmittance characteristics of the internal transmittance and the reflectance of reflection surfaces of a penta roof prism (image-erecting member) and a half transparent mirror (half-mirror) of a finder optical system according to the present embodiment, and of a penta roof prism (image-erecting member) and a half transparent mirror (half-mirror) of a conventional finder optical system.

FIG. 8 shows internal transmittance characteristics of the half transparent mirror (half-mirror) 98 in the finder optical system according to the present embodiment, and of a half transparent mirror (half-mirror) in a finder optical system according to a conventional example. FIG. 9 shows accumulated transmittance characteristics of the internal transmittance and the reflectance of reflection surfaces of the penta roof prism (image-erecting member) 60 and the superimposing optical system 90 of the finder optical system according to the present embodiment, and of a penta roof prism (image-erecting member) and a superimposing optical system of a conventional finder optical system. The penta roof prism 60 of the present embodiment uses S-LAL18 for the material, the roof surface is a totally reflection surface, and has a coating applied onto the third reflection surface. The penta roof prism of a conventional finder optical system uses S-BSL7 for the material, the roof surface has a silver coating, and has a silver coating applied onto the third reflection surface. As can be understood from FIG. 9, even though the penta roof prism 60 of the present embodiment uses a material having a high refractive index, a bright finder image can be achieved that has flat-line transmissive characteristics for accumulated transmittances over the entire visible light region with no coloration, and having an increased transmittance.

Condition (7) specifies the peak wavelength of a light bundle from the superimposing optical system 80 or the superimposing optical system (information display device) 90 in the finder optical system shown in FIG. 1 or FIG. 3.

Conditions (8) and (8') specify the refractive index at the d-line of the material of the penta roof prism 60. If a penta roof prism is formed with a material having a low refractive index (less than 1.62) that does not satisfy condition (8), although the spectral transmittance would be natural, a metal deposition film for totally reflecting a regular light bundle via a roof surface would become necessary when such a penta roof prism is applied to a finder optical system for a single-lens reflex camera, so that the transmittance would be reduced for a penta roof prism. Whereas, in the finder optical system of the present embodiment, by using a material having a high refractive index that satisfies condition (8) for the penta roof prism 60, it becomes possible to totally reflect the entire regular light bundle at the roof surface (the first reflection surface 62 and the second reflection surface 63). If the lower limit of condition (8) is exceeded, since the light bundle that does not totally reflect increases at the image periphery so that the image periphery darkens, it becomes necessary to apply a metal deposition film. Furthermore, it is desirable to satisfy condition (8') in order to further increase the finder magnification and stably totally reflect the light bundle.

Furthermore, it is desirable for the image-erecting member (penta roof prism 60) to satisfy the following condition (9) in order to more stably achieve total reflection at the roof surface (the first reflection surface 62 and the second reflection surface 63). If the lower limit of condition (9) is exceeded, the angle at which the peripheral light rays of the object image are incident becomes small, to the extent that the total reflection becomes unstable, so that the field of view may become difficult to see depending on the pupil position of the person viewing.

$$0.012 > (1.86 - np)/A, \text{ wherein} \tag{9}$$

'A' designates the angle (unit: degrees) between the incident surface 61 of the image-erecting member (the penta roof prism 60) and a ridge at which the roof surface (the first reflection surface 62 and the second reflection surface 63) meets.

Accordingly, in the finder optical system of the present embodiment, since the roof surface (the first reflection surface 62 and the second reflection surface 63) of the image-erecting member (penta roof prism 60) is configured as a total reflection surface that totally reflects an object-image containing light bundle, light quantity loss and coloration at the roof surface (the first reflection surface 62 and the second reflection surface 63) can be reduced so that a finder image that is bright and has a natural color tone can be achieved. Furthermore, in the finder optical system according to the present embodiment, by satisfying at least one of conditions (1) through (6), the occurrence of the object image (finder image) appearing visibly yellow due to using a material for the penta roof prism 60 having a very high refractive index can be effectively prevented (corrected). In other words, a finder optical system is achieved which can meet the demands for increased magnification of the observation magnification while reducing a coloration phenomenon in the finder image.

INDUSTRIAL APPLICABILITY

The finder optical system of the present invention is suitable for being installed in a photographing apparatus such as, e.g., a single-lens reflex camera.

REFERENCE SIGNS LIST

10 Single-lens reflex camera
20 Camera body
30 Interchangeable lens barrel
35 Objective optical system
40 Quick-return mirror
40R Reflection surface (Fourth reflection surface)
42 Sub-mirror
44 Optical filter
46 Image sensor
48 AF unit
50 Focusing plate
60 Penta roof prism (image-erecting member)
61 Incident surface
62 First reflection surface (roof reflection surface/total reflection surface)
63 Second reflection surface (roof reflection surface/total reflection surface)
64 Third reflection surface (light-bundle superimposing surface)
65 Exit surface
70 Loupe optical system
75 Eyepiece window
80 Superimposing optical system (information display device)
82 Illumination light source
84 Reflection mirror
86 Diopter-adjustment lens
88 Auxiliary prism
90 Superimposing optical system (information display device)
92 Illumination light source
94 Reflection mirror
96 Diopter-adjustment lens
98 half transparent mirror (optical element/light-bundle superimposing surface)

The invention claimed is:

1. A finder optical system comprising:
an image-erecting member, which erects an object image formed by an objective optical system, provided on an optical path from an object side toward an eyepiece side,
wherein the image-erecting member comprises a penta roof prism provided with a first reflection surface and a second reflection surface, which define a roof reflection surface that reflects an incident light bundle that emanated from the object, and
wherein the first reflection surface and the second reflection surface are configured as total-reflection surfaces that totally reflect the light bundle including the object image, and wherein the following relationships are satisfied:

$$0.012 > (1.86 - np)/A, \text{ and}$$

$$TR1_{Total}/TR2_{Total} > 1.05, \text{ wherein}$$

A designates the angle, in degrees, between an incident surface of the image-erecting member and a ridge at which the first reflection surface and the second reflection surface meets,
np designates the refractive index at the d-line of the material of the penta roof prism,
$TR1_{Total}$ is defined as an accumulated value that is calculated based upon the total of the average reflectance, with respect to light having a wavelength 400 nm through 450 nm, of only the reflection surfaces in the optical path on the eyepiece side from the objective optical system other than the first and second reflection surfaces, and the average transmittance, with respect to light having a wavelength 400 nm through 450 nm, of only the transmissive optical elements other than the penta roof prism, and
$TR2_{Total}$ is defined as an accumulated value that is calculated based upon the total of the average reflectance, with respect to light having a wavelength 500 nm through 650 nm, of only the reflection surfaces in the optical path on the eyepiece side from the objective optical system other than the first and second reflection surfaces, and the average transmittance, with respect to light having a wavelength 500 nm through 650 nm, of only the transmissive optical elements other than the penta roof prism.

2. The finder optical system according to claim 1, wherein the following relationship is satisfied:

$$R1_{Total}/R2_{Total} > 1.05, \text{ wherein}$$

$R1_{Total}$ designates an accumulated value of the average reflectance, with respect to light having a wavelength 400 nm through 450 nm, of reflection surfaces in the optical path on the eyepiece side from the objective optical system other than the first and second reflection surfaces; and
$R2_{Total}$ designates an accumulated value of the average reflectance, with respect to light having a wavelength 500 nm through 650 nm, of reflection surfaces in the optical path on the eyepiece side from the objective optical system other than the first and second reflection surfaces.

3. The finder optical system according to claim 1, further comprising a third reflection surface that includes a half-transparent surface on which a dielectric multi-layered film is provided and comprises a light-bundle superimposing surface, on which a light bundle from an information display device is superimposed with the finder optical system light path, to display predetermined information within a field-of-view of the finder optical system.

4. The finder optical system according to claim 3, wherein the following relationship is satisfied:

$$\lambda i > 500, \text{ wherein}$$

$\lambda i$ designates a peak wavelength, in nanometers, of a light bundle from the information display device.

5. The finder optical system according to claim 1 further comprising a further reflection surface which guides a light bundle from the objective optical system to the penta roof prism, and
   wherein the further reflection surface satisfies the following relationship:

$R1b/R2b>1.05$, wherein

R1b designates the average reflectance, with respect to light having a wavelength 400 nm through 450 nm, of the further reflection surface, and
   R2b designates the average reflectance, with respect to light having a wavelength 500 nm through 650 nm, of the further reflection surface.

6. The finder optical system according to claim 5, wherein the further reflection surface is provided on a quick return mirror of a camera including the finder optical system.

7. The finder optical system according to claim 1, wherein the following relationship is satisfied:

$T1_{Total}/T2_{Total}>1.05$, wherein $T1_{Total}$ designates an accumulated value of the average transmittance, with respect to light having a wavelength 400 nm through 450 nm, of transmissive optical elements in the optical path on the eyepiece side from the objective optical system other than the penta roof prism, and
   $T2_{Total}$ designates an accumulated value of the average transmittance, with respect to light having a wavelength 500 nm through 650 nm, of transmissive optical elements in the optical path on the eyepiece side from the objective optical system other than the penta roof prism.

8. The finder optical system according to claim 1, comprising an optical element including a light-bundle superimposing surface at a position toward the eyepiece side with respect to the penta roof prism, wherein the optical element including the light-bundle superimposing surface reflects and superimposes a light bundle from the information display device onto the optical path of the finder optical system, and
   wherein the following relationship is satisfied:

$T1/T2>1.05$, wherein

T1 designates the average transmittance, with respect to light having a wavelength 400 nm through 450 nm, of the optical element including the light-bundle superimposing surface, and
   T2 designates the average transmittance, with respect to light having a wavelength 500 nm through 650 nm, of the optical element including the light-bundle superimposing surface.

9. The finder optical system according to claim 8, wherein the following relationship is satisfied:

$\lambda i>500$, wherein

λi designates a peak wavelength, in nanometers, of a light bundle from the information display device.

10. The finder optical system according to claim 1, wherein each surface of the first and second reflection surfaces includes an anti-contamination treatment for maintaining total reflection of the light bundle including the object image.

11. The finder optical system according to claim 10, wherein the anti-contamination treatment comprises a fluorine coating.

12. The finder optical system according to claim 1, wherein the following relationship is satisfied:

$np>1.62$.

13. The finder optical system according to claim 1, further comprising a half transparent surface on which a dielectric multilayer film is provided, the half transparent surface comprises a light bundle superimposing surface on which a light bundle from an information display device is superimposed with the finder optical system light path, to display predetermined information within a field of view of the finder optical system.

14. The finder optical system according to claim 1, wherein a light incident surface and a light exit surface of the penta roof prism are each provided with an anti-reflective coating.

15. The finder optical system according to claim 1, further comprising an optical system including a light bundle superimposing surface which superimposes a light bundle from an information display device with the finder optical path light system, the light bundle superimposing surface positioned at a light exit side of the penta roof prism.

16. The finder optical system according to claim 1, wherein the penta roof prism additionally comprises a third reflection surface, by which a light bundle, that is reflected by the first and second reflection surfaces, is reflected and exits toward the eyepiece side, wherein the third reflection surface comprises a half-transparent surface on which a dielectric multi-layered film is provided and comprises a light-bundle superimposing surface, on which a light bundle from an information display device is superimposed with the finder optical system light path, to display predetermined information within a field-of-view of the finder optical system, and
   wherein a reflection treatment, on the third reflection surface, satisfies the following relationship:

$R1a/R2a>1.05$, wherein

R1a designates the average reflectance, with respect to light having a wavelength 400 nm through 450 nm, of the third reflection surface, and
   R2a designates the average reflectance, with respect to light having a wavelength 500 nm through 650 nm, of the third reflection surface,
   the finder optical system further comprising a further reflection surface which guides a light bundle from the objective optical system to the penta roof prism, and
   wherein the further reflection surface satisfies the following relationship:

$R1b/R2b>1.05$, wherein

R1b designates the average reflectance, with respect to light having a wavelength 400 nm through 450 nm, of the further reflection surface, and
   R2b designates the average reflectance, with respect to light having a wavelength 500 nm through 650 nm, of the further reflection surface, and
   wherein each surface of the first and second reflection surfaces is uniformly finished and includes an anti-contamination treatment for maintaining total reflection of the light bundle including the object image.

17. A finder optical system comprising:
   an image-erecting member, which erects an object image formed by an objective optical system, provided on an optical path from an object side toward an eyepiece side, wherein the image-erecting member comprises a penta roof prism provided with a first reflection surface and a second reflection surface, which define a roof reflection surface that reflects an incident light bundle that emanated from the object, and wherein the first reflection surface and the second reflection surface are configured as total-reflection surfaces that totally reflect the light bundle including the object image, and wherein the following relationships are satisfied:

$0.012 > (1.86-np)/A$, and $TR1_{Total}/TR2_{Total} > 1.05$, wherein the penta roof prism further comprises a third reflection surface, by which a light bundle, that is reflected by the first and second reflection surfaces, is reflected and exits toward the eyepiece side, and wherein a reflection treatment, on the third reflection surface, satisfies the following relationship:

$R1a/R2a > 1.05$, wherein

A designates the angle, in degrees, between an incident surface of the image-erecting member and a ridge at which the first reflection surface and the second reflection surface meets, np designates the refractive index at the d-line of the material of the penta roof prism, $TR1_{Total}$ is defined as an accumulated value that is calculated based upon the total of the average reflectance, with respect to light having a wavelength 400 nm through 450 nm, of only the reflection surfaces in the optical path on the eyepiece side from the objective optical system other than the first and second reflection surfaces, and the average transmittance, with respect to light having a wavelength 400 nm through 450 nm, of only the transmissive optical elements other than the penta roof prism, $TR2_{Total}$ is defined as an accumulated value that is calculated based upon the total of the average reflectance, with respect to light having a wavelength 500 nm through 650 nm, of only the reflection surfaces in the optical path on the eyepiece side from the objective optical system other than the first and second reflection surfaces, and the average transmittance, with respect to light having a wavelength 500 nm through 650 nm, of only the transmissive optical elements other than the penta roof prism R1a designates the average reflectance, with respect to light having a wavelength 400 nm through 450 nm, of the third reflection surface, and R2a designates the average reflectance, with respect to light having a wavelength 500 nm through 650 nm of the third reflection surface wherein the following relationship is satisfied:

$R1a/R2a \geq 0.0015 \times \lambda 80 + 0.51$ wherein λ80 represents a wavelength at which a spectral transmittance, including reflection loss, is 80% for an optical element having a thickness of 10 mm.

18. The finder optical system according to claim 17, wherein each surface of the first and second reflection surfaces includes an anti-contamination treatment for maintaining total reflection of the light bundle including the object image.

19. The finder optical system according to claim 18, wherein the anti-contamination treatment comprises a fluorine coating.

20. A finder optical system comprising:

an image-erecting member, which erects an object image formed by an objective optical system, provided on an optical path from an object side toward an eyepiece side, wherein the image-erecting member comprises a penta roof prism provided with a first reflection surface and a second reflection surface, which define a roof reflection surface that reflects an incident light bundle that emanated from the object, and wherein the first reflection surface and the second reflection surface are configured as total-reflection surfaces that totally reflect the light bundle including the object image, and wherein the following relationships are satisfied:

$0.012 > (1.86-np)/A$, and $TR1_{Total}/TR2_{Total} > 1.05$, wherein

A designates the angle, in degrees, between an incident surface of the image-erecting member and a ridge at which the first reflection surface and the second reflection surface meets, np designates the refractive index at the d-line of the material of the penta roof prism, $TR1_{Total}$ designates an accumulated value of the average reflectance, with respect to light having a wavelength 400 nm through 450 nm, of the reflection surfaces in the optical path on the eyepiece side from the objective optical system other than the first and second reflection surfaces, and the average transmittance, with respect to light having a wavelength 400 nm through 450 nm, of the transmissive optical elements other than the penta roof prism, and $TR2_{Total}$ designates an accumulated value of the average reflectance, with respect to light having a wavelength 500 nm through 650 nm, of the reflection surfaces in the optical path on the eyepiece side from the objective optical system other than the first and second reflection surfaces, and the average transmittance, with respect to light having a wavelength 500 nm through 650 nm, of the transmissive optical elements other than the penta roof prism, and wherein the penta roof prism additionally comprises a third reflection surface, by which a light bundle, that is reflected by the first and second reflection surfaces, is reflected and exits toward the eyepiece side, wherein the third reflection surface comprises a half-transparent surface on which a dielectric multi-layered film is provided and comprises a light-bundle superimposing surface, on which a light bundle from an information display device is superimposed with the finder optical system light path, to display predetermined information within a field-of-view of the finder optical system, and wherein a reflection treatment, on the third reflection surface, satisfies the following relationship:

$R1a/R2a > 1.05$, wherein

R1a designates the average reflectance, with respect to light having a wavelength 400 nm through 450 nm, of the third reflection surface, and R2a designates the average reflectance, with respect to light having a wavelength 500 nm through 650 nm, of the third reflection surface, the finder optical system further comprising a further reflection surface which guides a light bundle from the objective optical system to the penta roof prism, and wherein the further reflection surface satisfies the following relationship:

$R1b/R2b > 1.05$, wherein

R1$b$ designates the average reflectance, with respect to light having a wavelength 400 nm through 450 nm, of the further reflection surface, and R2$b$ designates the average reflectance, with respect to light having a wavelength 500 nm through 650 nm, of the further reflection surface, and wherein each surface of the first and second reflection surfaces is uniformly finished and includes an anti-contamination treatment for maintaining total reflection of the light bundle including the object image.

* * * * *